(12) United States Patent
Scalise et al.

(10) Patent No.: US 8,290,205 B2
(45) Date of Patent: Oct. 16, 2012

(54) DATING IMAGES FROM SCANNED WATERMARKS

(75) Inventors: Anthony Scalise, Fairport, NY (US); Andrew C. Blose, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 738 days.

(21) Appl. No.: 12/491,268

(22) Filed: Jun. 25, 2009

(65) Prior Publication Data

US 2010/0329575 A1 Dec. 30, 2010

(51) Int. Cl.
*G06K 9/62* (2006.01)
(52) U.S. Cl. ......................... 382/100; 382/190
(58) Field of Classification Search .................. None
See application file for complete search history.

(56) References Cited

U.S. PATENT DOCUMENTS

| 6,351,321 | B1 | 2/2002 | McIntyre et al. |
| 6,606,411 | B1 | 8/2003 | Loui et al. |
| 6,636,648 | B2 | 10/2003 | Loui et al. |
| 6,745,186 | B1 | 6/2004 | Testa et al. |
| 2006/0198559 | A1* | 9/2006 | Manico et al. ............... 382/305 |
| 2007/0058224 | A1 | 3/2007 | Kawamoto et al. |
| 2007/0250529 | A1 | 10/2007 | Beato et al. |
| 2007/0250532 | A1 | 10/2007 | Beato et al. |
| 2008/0219503 | A1* | 9/2008 | Di Venuto et al. ............ 382/103 |

FOREIGN PATENT DOCUMENTS

EP 1 054 560 A2 11/2000

OTHER PUBLICATIONS

"Distinctive Features from Scale-Invariant Keypoints," by D. Lowe, International Journal of Computer Vision, vol. 60, No. 2, pp. 91-110, 2004.

* cited by examiner

*Primary Examiner* — Brian P Werner
(74) *Attorney, Agent, or Firm* — Kevin E. Spaulding

(57) ABSTRACT

A method for dating photographic prints comprising scanning a front side of a photographic print forming an image scan; scanning a back side of the photographic print forming a back scan; defining a database of photographic print watermarks, each photographic print watermark comprising a representation of a watermark pattern and an associated date range; analyzing the back scan using a cross-correlation process between the back scan and the watermark patterns in the database of photographic print watermarks to identify a matching photographic print watermark; determining a date range for the image scan responsive to the identified matching photographic print watermark; and associating the determined date range with the image scan.

19 Claims, 13 Drawing Sheets

DATING IMAGES FROM SCANNED WATERMARKS

FIELD OF THE INVENTION

The present invention pertains to the field of image organization and more particularly to determining a date range for a photograph.

BACKGROUND OF THE INVENTION

Consumers today are switching from film-based chemical photography to digital photography in increasing numbers. The instantaneous nature of image capture and review, the ease of use, numerous output and sharing options, multimedia capabilities, and on-line and digital media storage capabilities have all contributed to consumer acceptance of this technological advancement. A hard drive, on-line account, or a DVD can store thousands of images, which are readily available for printing, transmitting, conversion to another format, conversion to another media, or used to produce an image product. Since the popularity of digital photography is relatively new, the majority of images retained by a typical consumer usually takes the form of hardcopy media. These legacy images may span decades of time and have a great deal of personal and emotional importance to the collection's owner. In fact, these images often increase in value to their owners over time. Thus even images that were once not deemed good enough for display are now cherished. These images are often stored in boxes, albums, frames, or even their original photofinishing return envelopes.

Getting a large collection of legacy images into a digital form is often a formidable task for a typical consumer. The user is required to sort through hundreds of physical prints and place them in some relevant order, such as chronology or sorting by event. Typically events are contained on the same roll of film or across several rolls of film processed in the same relative time frame. After sorting the prints the user would be required to scan the media to make a digital version of the images. Scanning hardcopy image media such as photographic prints to obtain a digital record is well known. Many solutions currently exist to perform this function and are available at retail from imaging kiosks and digital minilabs and at home with "all-in-one" scanner/printers or with personal computers equipped with media scanners. Some media scanning devices include media transport means, simplifying the task of scanning hardcopy media. Using any of these systems requires that the user spend time or expense converting the images into a digital form only to be left with the problem of providing some sort of organizational structure to the collection of digital files generated.

The prior art teaches sorting scanned hardcopy images by physical characteristics. However, this grouping would be limited to coarse groupings of images and a general chronological sequence, which may be inadequate for very large image collections and may not be as useful as smaller groupings. What is needed is a system to rapidly convert large volumes of hardcopy media images into digital form and to automatically organize them into an improved chronological order and more accurate event groupings. This will provide a way for a consumer to easily and affordably obtain a digital version of a hardcopy image collection that will be a high quality presentation provided with a meaningful context.

U.S. Pat. No. 6,745,186 entitled "Product and Method for Organizing and Searching digital Images" describes methods of organizing digital images by sorting or organizing scanned hardcopy images by physical characteristics including shape, size, cut, texture, border or finish.

U.S. Pat. No. 6,606,411 entitled "Method for Automatically Classifying Images into Events" describes methods for separating a group of images into events on the basis of time or date. Long lapses of time are used as event boundaries. Thus, when grouping images for output products like albums or for organizing a database of images, the images are grouped by similar time stamps.

U.S. Pat. No. 6,636,648 entitled "Albuming Method with Automatic Page Layout" describes methods for laying out album pages on the basis of time or date and content. What is meant by content in this patent is a basic image analysis that identifies similar colorations such as histograms.

U.S. Pat. No. 6,351,321B1 entitled "Data Scanning and Conversion System for Photographic Image Reproduction" describes methods for identifying camera exposed information such as date/time/exposure conditions on digitized print images and employing techniques to edit out, crop, enhance, and replace the camera exposed information.

While some of the forgoing patents provide some help in organizing images, there still is a need to provide further efficient techniques for automatically organizing images into further defined groupings.

SUMMARY OF THE INVENTION

The present invention represents a method for dating photographic prints comprising:

a) scanning a front side of a photographic print forming an image scan;

b) scanning a back side of the photographic print forming a back scan;

c) defining a database of photographic print watermarks, each photographic print watermark comprising a representation of a watermark pattern and an associated date range;

d) analyzing the back scan using a cross-correlation process between the back scan and the watermark patterns in the database of photographic print watermarks to identify a matching photographic print watermark;

e) determining a date range for the image scan responsive to the identified matching photographic print watermark; and f) associating the determined date range with the image scan.

This invention has the advantage that the date of a photographic print can be estimated without a prior knowledge provided by a user. This enables the organization of large numbers of photographic images without the need for user intervention.

It has the additional advantage that the date of a photographic print narrowed down to a date range when a particular type of photographic material was manufactured by analyzing scans of watermark patterns on the back of photographic prints.

It has the further advantage the cross-correlation analysis process represents a robust method for identifying watermark patterns that is insensitive to variations introduced in the media manufacturing and scanning process.

DETAILED DESCRIPTION OF THE INVENTION

Figure 1:
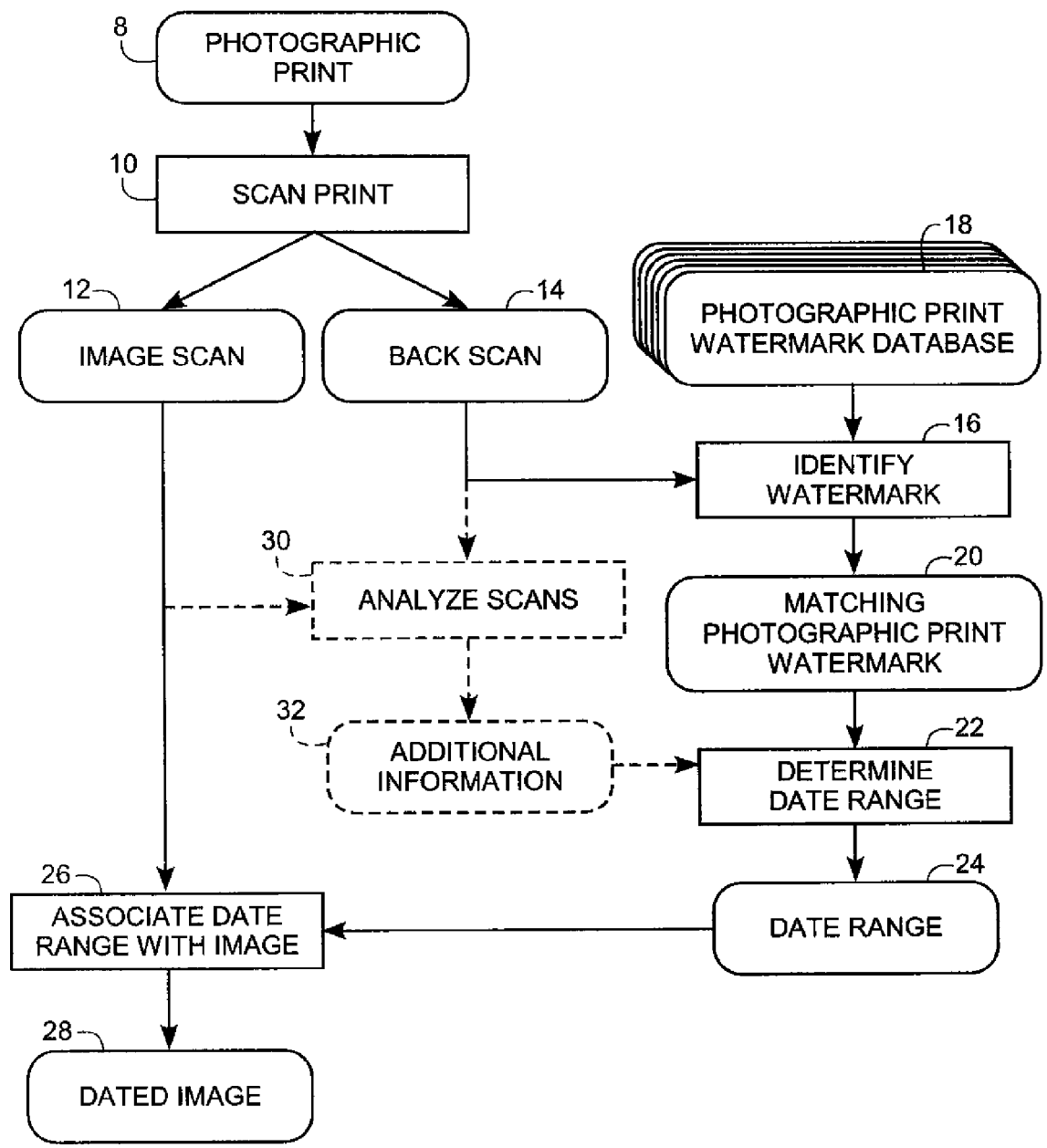
FIG. 1 is a flowchart illustrating the method of the present invention.

There are many applications where it is desirable to digitize photographic prints. For example, a user may have a shoebox full of family photographs and would like to make a digital database of these photographs for viewing and sharing with other family members. Often these photographs are unlabeled, and therefore the user may have no information about the date that the photographs were taken. It is desirable to be able to determine the date of the photographs for historical purposes, as well as to aid in the organization of the digitized images. Manufacturers of photographic print materials often included watermark patterns on the back of photographic prints. The terminology watermark patterns as used in the present application refers to visible patterns that are placed on the back of photographic print materials during the manufacturing process. Such watermark patterns are typically printed on the photographic print materials using some form of printing process, such as offset or gravure printing. Often the watermark patterns contain manufacturer-specific content such as company names, logos or trademarks. Watermark patterns may also contain other types of content such as lines and various geometric patterns. Commonly, the watermark patterns are printed in light-colored inks, such as light yellow, light blue or light gray inks, to minimize the likelihood that the watermark patterns will show through to be visible from the front side a photographic print. These watermark patterns were often modified with each succeeding generation of the photographic print materials, and therefore provide valuable information about the date of the photographic print. In U.S. Patent Application Publication 2006/0198559, Manico et al. have disclosed a method for automatically organizing prints based on analysis of the photographic print watermark patterns, the disclosure of which is incorporated herein by reference. The present invention is directed toward the analysis of photographic print watermark patterns using a cross-correlation algorithm as part of the process of estimating the date of a particular photographic image.

The present invention will now be described with reference to FIG. 1. First a scan print step 10 is used to scan the front and back sides of a photographic print 8 to produce an image scan 12 and a back scan 14, respectively. The photographic print 8 may be an optical photographic print produced by printing a photographic negative on conventional silver halide photographic print materials. The photographic print 8 may also be a digital photographic print produced by printing a photographic image on conventional silver halide photographic print materials using a digital printer. Alternately, it could be a photographic print produced using other printing technologies such as thermal dye diffusion printers or inkjet printers. Next an identify watermark step 16 is used to compare the back scan 14 with a photographic print watermark database 18 to identify a matching photographic print watermark 20. Each photographic print watermark in the photographic print watermark database 18 includes a representation of a watermark pattern together with an associated date range. A determine date range step 22 is used to determine a date range 24 associated with the matching photographic print watermark 20 responsive to the matching photographic print watermark 20. In one embodiment of the present invention, the date range 24 is determined by looking up the date range associated with the matching photographic print watermark 20 in the photographic print watermark database 18. Finally an associate date range with image step 26 is used to associate the date range 24 with the image scan 12 to produce a dated image 28.

Several optional features are also illustrated in FIG. 1 using broken lines. In particular, an analyze scan step 30 can be used to analyze the image scan 12 or the back scan 14 to determine additional information 32 that can be useful in the determining date range step 22.

Each of the features of the present invention will now be described in more detail. In a preferred embodiment of the present invention, the scan print step 10 is performed using a high speed scanner, such as one of the Kodak i600 Series Scanners, that simultaneously scans both the front side and the back side of the photographic print 8. Such scanners can be used in photographic kiosk systems for providing digitization services for collections of a user's photographic prints. Alternately, the scan print step 10 can be performed using other types of scanners, such as consumer flatbed scanners. In such cases, it would be necessary to scan the front of the photographic print 8 to produce the image scan 12 and then to physically turn the photographic print 8 over to scan the back of the photographic print 8 to produce the back scan 14.

Figure 2:
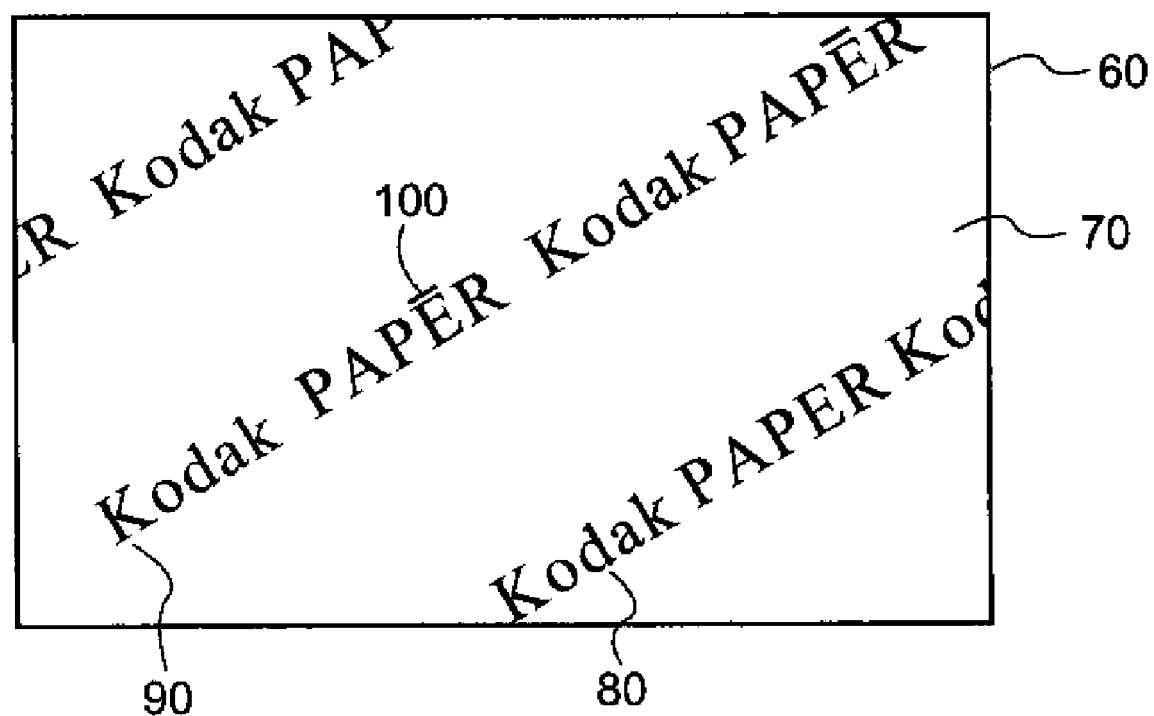
FIG. 2 is an illustration of the back side of a photographic print depicting the manufacturer's media watermark pattern.

FIG. 2 is an illustration of a back side 70 of a photographic print 60 having an image on the front side (not shown). In the embodiment illustrated, the back side 70 has manufacturer's media watermark patterns 80 and 90 thereon. These watermark patterns represent a watermark style that would be recognized by the system by comparison to the photographic print watermark database 18 (FIG. 1). The example shown in FIG. 2 illustrates a common configuration for watermark pattern presentation which includes lines of evenly spaced text and/or graphics that run diagonally across the back surface of hardcopy imaging media. In the embodiment illustrated, each of the watermark patterns 80 and 90 comprise the repeating text "Kodak PAPER". Watermark pattern 90 includes a watermark encoding mark 100 which, in the embodiment illustrated, appears as a short line over the "E" in the text "PAPER". This encoding mark 100 is typically associated with a date of manufacture, or a particular position on the master roll from which the print paper was obtained.

Figure 3A:
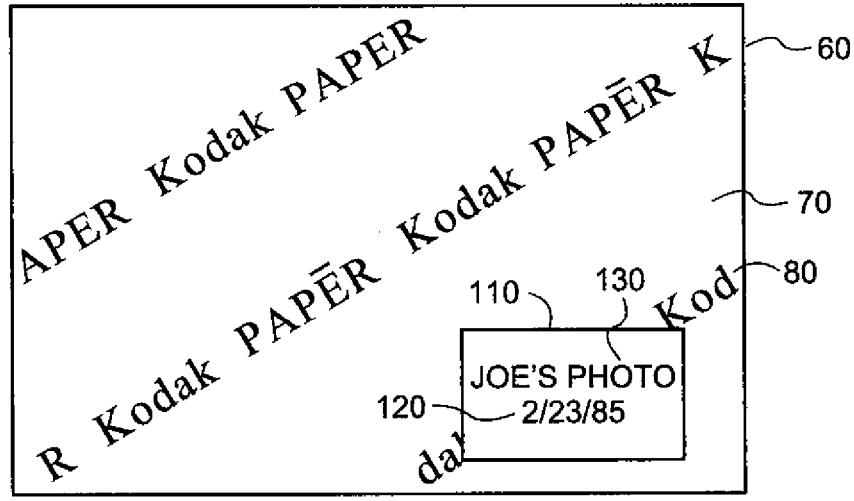
FIG. 3A is an illustration of the back side of a photographic print including an ink printed photofinishing process applied stamp including the date of image processing.
Figure 3B:
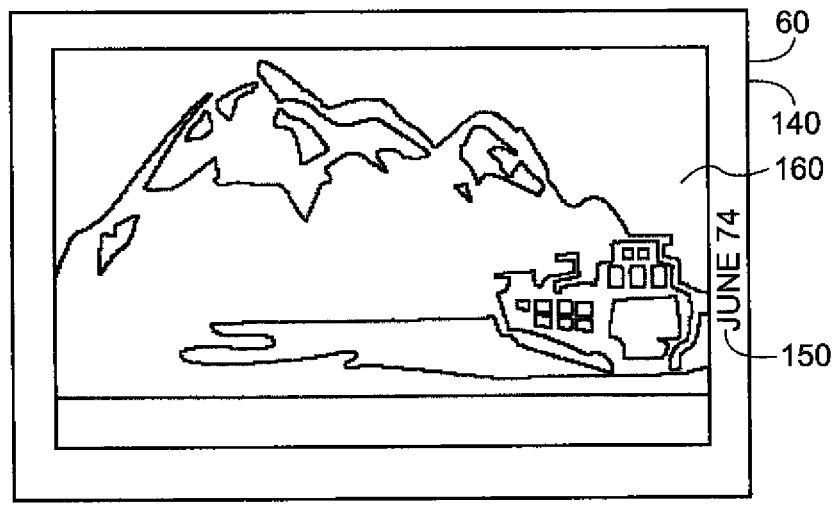
FIG. 3B is an illustration of the image side of a photographic print including a photographically exposed photofinishing process applied graphic including the date of image processing.
Figure 3C:
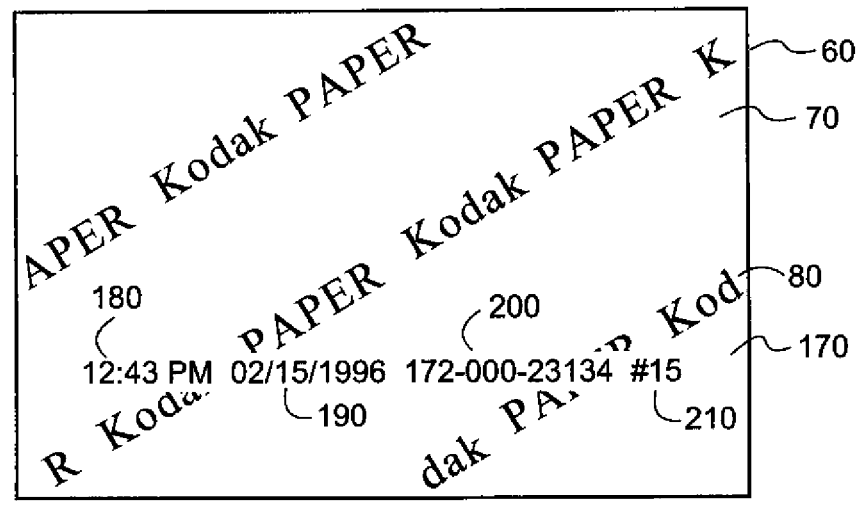
FIG. 3C is an illustration of the back side of a photographic print including a digitally printed photofinishing process applied indicia including a camera recorded time and date of image capture, film roll ID number, and film roll frame number.

The image scan 12 and the back scan 14 often contain additional clues as to the date of a photographic print. FIGS. 3A, 3B, and 3C illustrate various photofinisher applied markings that are used by photofinishers to provide additional information about the photographic print 60. FIG. 3A is an illustration of the back side 70 of a photographic print 60 that includes a stamp 110 that is applied during the photofinishing process. In the illustrated embodiment the stamp 110 includes an original date of processing indication 120 and additional information 130 such as a logo, graphic, code number, and the like, either or both being presented in eye or machine readable form. Also recorded on back side 70 is the manufacturer's watermark pattern 80.

FIG. 3B is an illustration of the image side 160 of photographic print 60. In addition to the image 162, the image side 160 also includes a photographically exposed photofinishing process applied graphic 150. In the embodiment illustrated, graphic 150 is printed in the border 140 and includes the date of processing.

FIG. 3C is an illustration of the back side 70 of a photographic print 60 that includes a printed indicia 170 that is applied during the photofinishing process. In the illustrated embodiment, the printed indicia 170 includes an image capture time 180 and date 190, film roll ID number 200, and film roll frame number 210. Information recorded by printed indicia 170 is indicative of images captured using Advanced Photo System cameras.

Figure 4A:
FIG. 4A is an illustration of the image side of a photographic print including a camera exposed indicia recorded by the film media depicting the time and date of image capture.
Figure 4B:
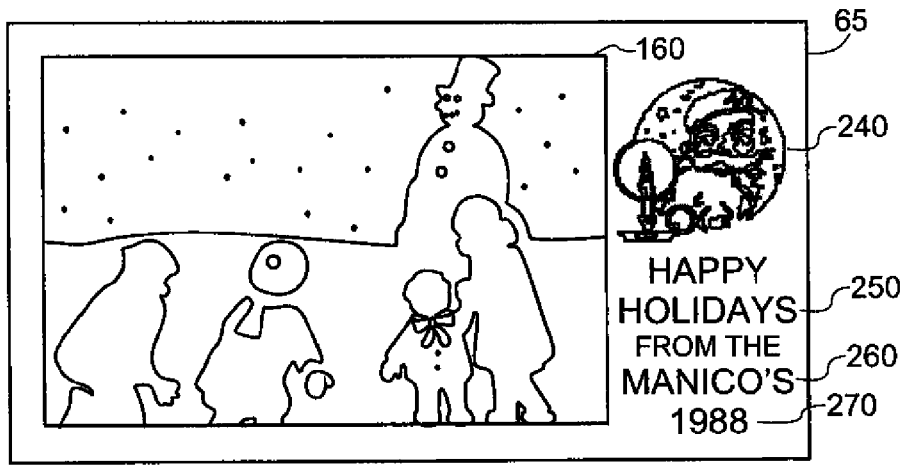
FIG. 4B is an illustration of the image side of a photographic greeting card including a photofinisher applied decorative graphic including a user selected text and date.
Figure 4C:
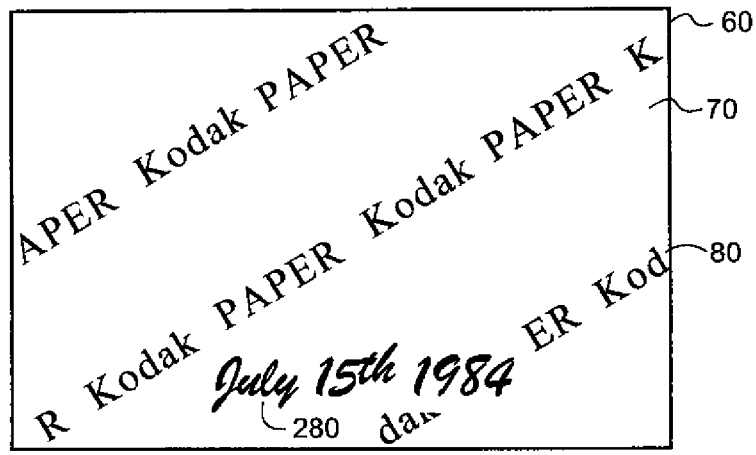
FIG. 4C is an illustration of the back side of a photographic print including a manufacturer's watermark and a user applied handwritten indicia including a date.

FIGS. 4A, 4B, and 4C illustrate additional methods used by photofinishers and photographers to provide additional information on photographic prints. FIG. 4A is an illustration of the image side 160 of a photographic print 60 including a camera exposed indicia 215 recorded on the photographic negative depicting the time 220 and date 230 of image capture.

FIG. 4B is an illustration of the image side 160 of a photographic greeting card 65 including a photofinisher applied decorative graphic 240, a user selected event designation 250, personal message 260, and date 270. Recognizing the photographic print as a greeting card will provide additional opportunity for event dating.

FIG. 4C is an illustration of the back side 70 of a photographic print 60 having a manufacturer's watermark pattern 80 and a user applied handwritten date annotation 280. It is a common practice for users to annotate the surface of photographs with pens, markers, pencils and the like to record significant information regarding events, date, persons and locations that are relevant to the images recorded on the media. Handwriting analysis and OCR software can be used to translate the text to usable data format.

Figure 5A:
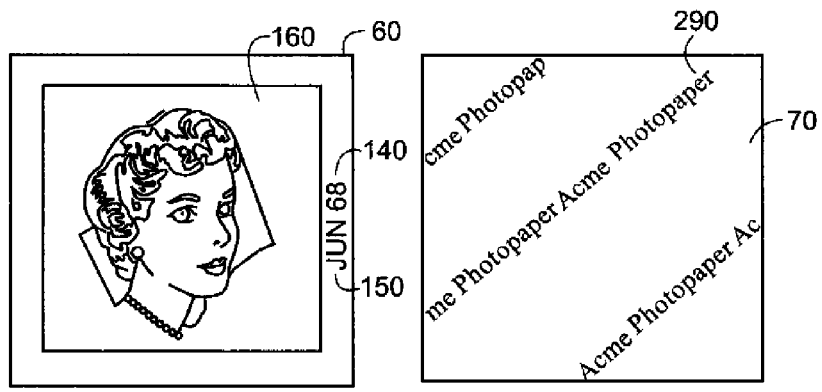
FIG. 5A is an illustration of the image side and back side of a photographic print including a photographically exposed photofinishing process applied graphic including the date of image processing and an unidentified manufacturer's watermark.
Figure 5B:
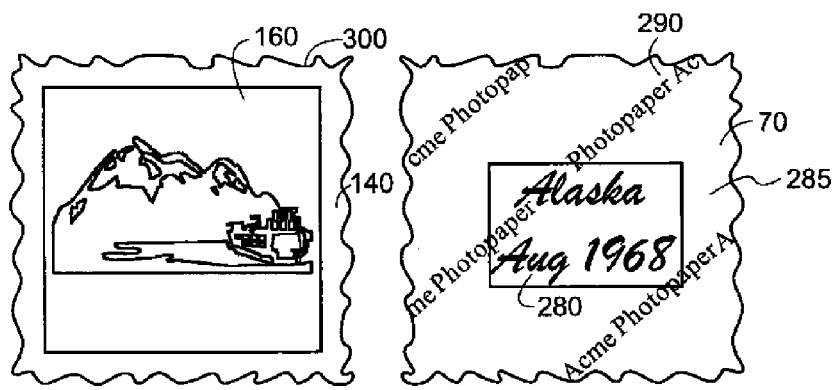
FIG. 5B is an illustration of the image side and back side of a photographic print including a user applied handwritten indicia including a date, an unidentified manufacturer's watermark, and a unique media shape characteristic.
Figure 5C:
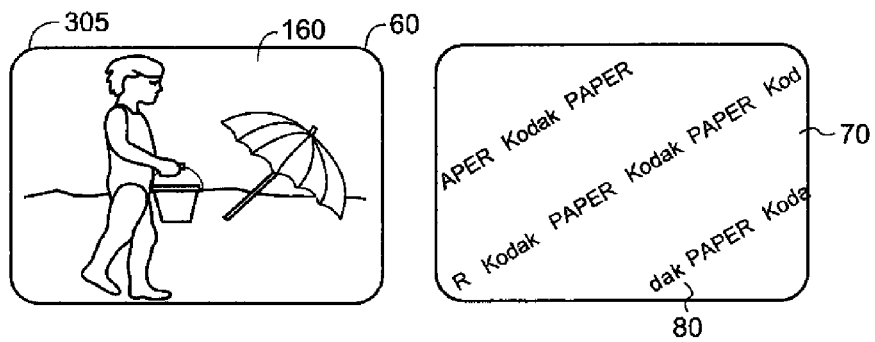
FIG. 5C is an illustration of the image side and back side of a photographic print including identified manufacturer's watermark and an identified media shape characteristic.

FIGS. 5A, 5B, and 5C illustrate additional characteristics of photographic prints that can be used to provide additional information about the corresponding image scans. FIG. 5A is an illustration of the image side 160 and back side 70 of a photographic print 60. In addition to a manufacturer's watermark pattern 290 recorded on back side 70, the image side 160 includes photographically exposed photofinishing process applied graphic 150 that includes the date of image processing printed in image border 140.

FIG. 5B is an illustration of a photographic print media 300 having unique serrated media shape characteristics. The image side 160 includes border 140. Back side 70 includes a handwritten date annotation 280, an additional handwritten annotation 285 and a manufacturer's watermark pattern 290.

FIG. 5C is an illustration of image side 160 and back side 70 for a photographic print 60 with a media shape having rounded corners 305 with a ½" (1.27 cm) radius, and a manufacturer's watermark pattern 80.

Figure 6A:
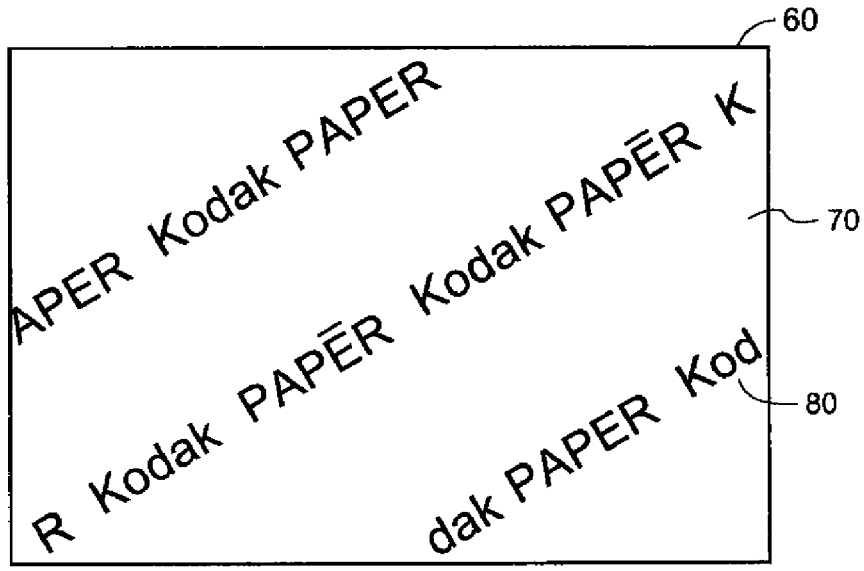
FIG. 6A is an illustration of the back side of a photographic print including an identified manufacturer's watermark with the known time period of manufacture "A"
Figure 6B:
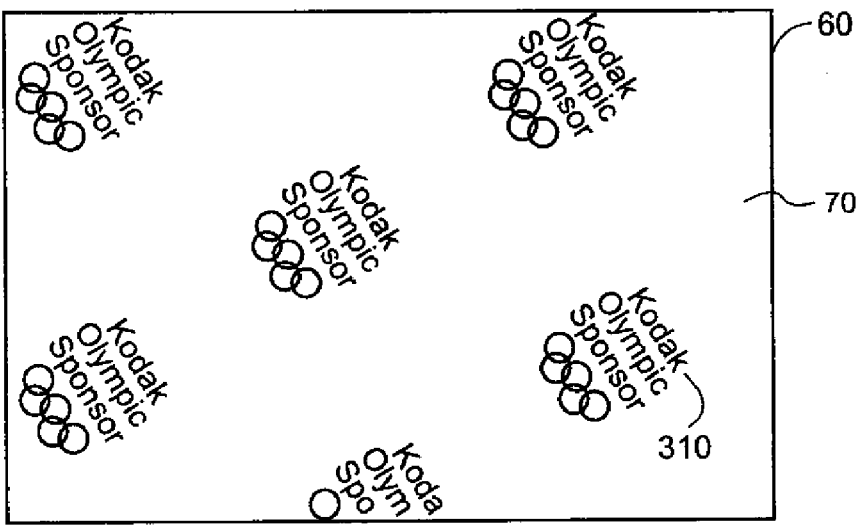
FIG. 6B is an illustration of the back side of a photographic print including an identified manufacturer's watermark with the known time period of manufacture "B"
Figure 6C:
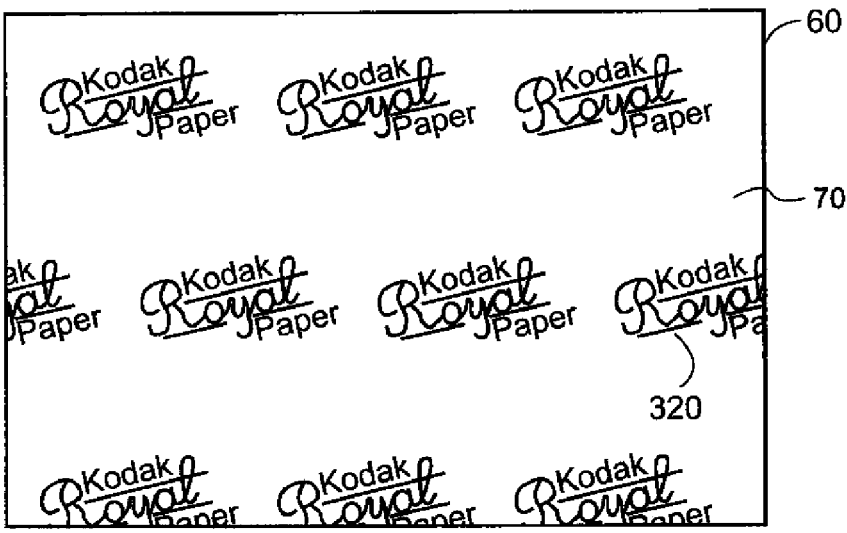
FIG. 6C is an illustration of the back side of a photographic print including an identified manufacturer's watermark with the known time period of manufacture "C"

FIGS. 6A, 6B, and 6C illustrate various different types of watermark patterns used by manufacturers that have been made available to the market over time. FIG. 6A is an illustration of the back side 70 of a photographic print 60 including a manufacturer's watermark pattern 80 with the text "Kodak PAPER." FIG. 6B is an illustration of the back side 70 of a photographic print 60 having a particular watermark pattern 310 that was designed to commemorate a manufacturer's sponsorship of the Olympics and includes text and graphic. Watermark pattern 310 would be associated with a fairly narrow date range. FIG. 6C is an illustration of the back side 70 of a photographic print 60 having a particular watermark pattern 320 that was designed by the manufacturer to indicate the high quality, superior gloss and heavier stock of the media bearing this watermark pattern.

Figure 7:
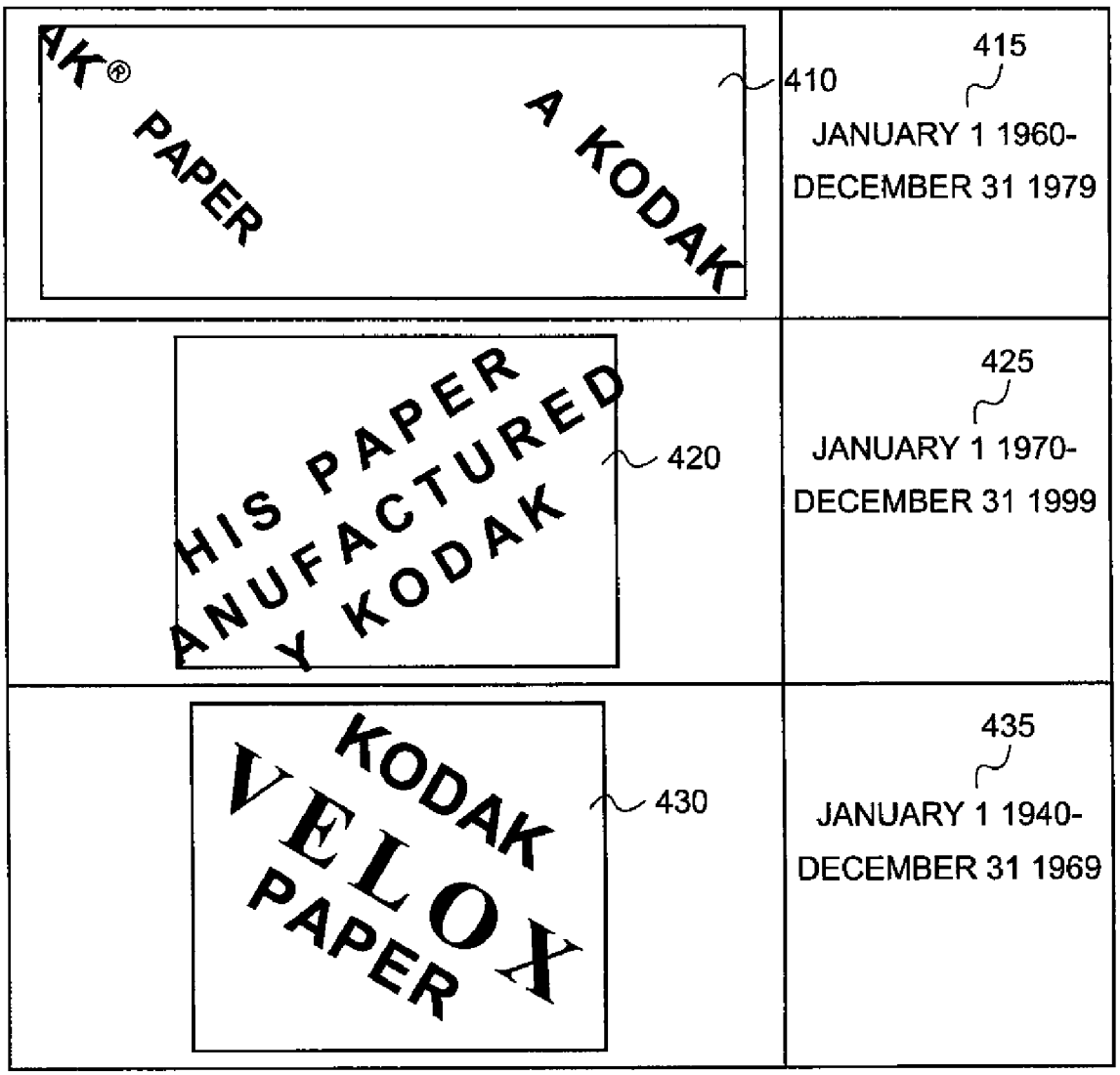
FIG. 7 illustrates a series of entries in a photographic print watermark database.

Returning now to a discussion of the details of FIG. 1, the photographic print watermark database 18 stores information regarding various photographic print watermarks that have been used by manufacturers of photographic print materials at different dates. The entry for each photographic print watermark in the photographic print watermark database 18 includes a representation of the watermark pattern together with an associated date range. FIG. 7 shows a series of entries in a photographic print watermark database 18 for a number of different photographic print materials manufactured by Eastman Kodak Company. Each photographic print watermark shown in FIG. 7 has associated with it a date range corresponding to the years that photographic print materials with these photographic print watermarks were manufactured. First watermark pattern 410 has an associated first date range 425. Likewise, second watermark pattern 420 has an associated second date range 415 and third watermark pattern 430 has an associated third date range 435. An actual photographic print watermark database 18 could potentially contain hundreds of watermark patterns.

Figure 8:
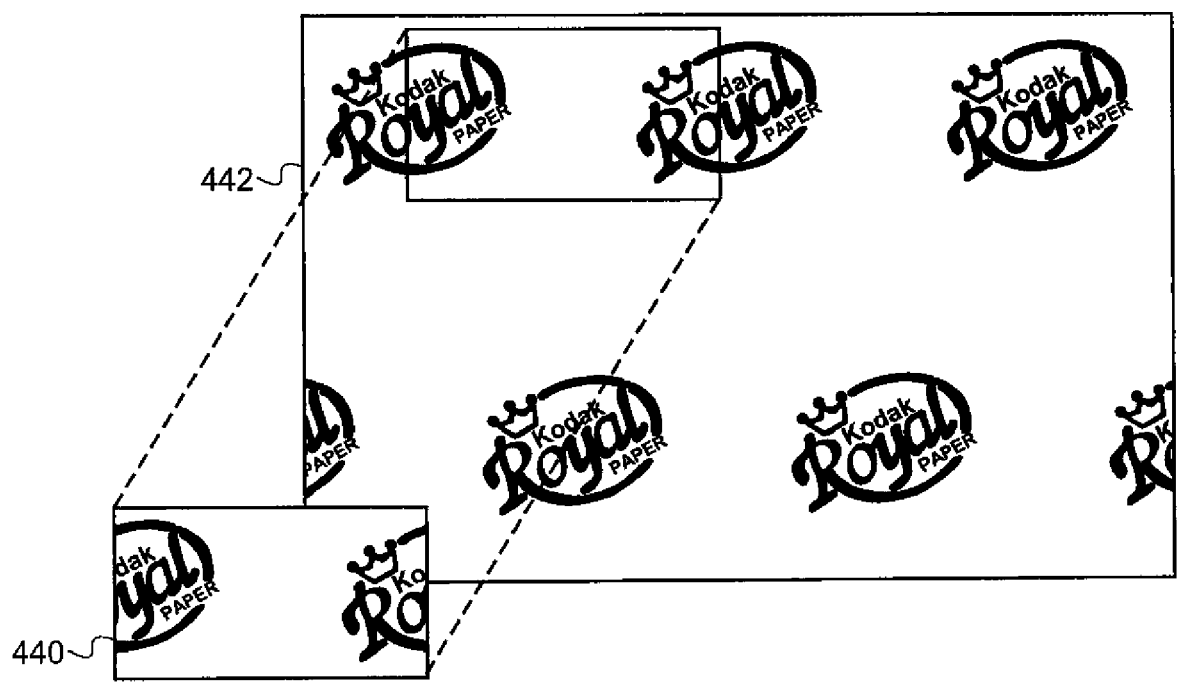
FIG. 8 illustrates cropping a watermark bitmap from a scanned reference pattern.

There are a number of different ways that representations of the watermark patterns can be stored in the photographic print watermark database 18 (FIG. 1). In a preferred embodiment of the present invention, a bitmap image is stored corresponding to the watermark pattern. The bitmap image for a particular watermark pattern can be determined by scanning a sample of a reference photographic print having that watermark, and then cropping out a region of the scanned watermark pattern. This is illustrated in FIG. 8 which shows a watermark bitmap 440 cropped out of a back scan 442 for a particular watermark pattern.

Typically, watermark patterns that have been used by photographic material manufacturers are periodic in nature, repeating on some fixed interval. In such cases, it will generally be desirable to crop out a watermark bitmap 440 that contains at least one period of the watermark pattern. In some cases, it may be desirable to process the watermark bitmap 440 using a series of enhancement operations to provide a clear representation of the watermark pattern. For example, it may be desirable to increase the contrast of the watermark pattern 440 using a histogram stretching algorithm or a thresholding operation. It may also desirable to correct for any non-uniformities in the background of the watermark bitmap 440 to provide a uniform white background. Such non-uniformities could, for example, be caused by yellowing of the photographic print material. It may also be desirable to perform a noise cleaning operation to remove artifacts resulting from dust specks, scratches and any other extraneous markings. The watermark bitmap 440 can be stored as a continuous tone color image (e.g., 8-bits/pixel/color), or can be converted to grayscale and stored as a continuous tone grayscale image (e.g., 8-bits/pixel) or a binary grayscale image (e.g., 1 bit/pixel).

In another embodiment of the present invention, the representations of the watermark patterns can be stored in the photographic print watermark database 18 using geometric descriptions. For example, a watermark pattern can be described by specifying geometric parameters defining the relative positions and sizes for a series of lines, circles, text characters and other geometric objects that characterize the design of the watermark pattern. For example, some photographic print materials are manufactured using watermarks having a series of diagonal lines of a given angle, line width and spacing. These patterns can be represented by a list specifying geometric parameters describing each line in the watermark pattern.

Figure 9A:
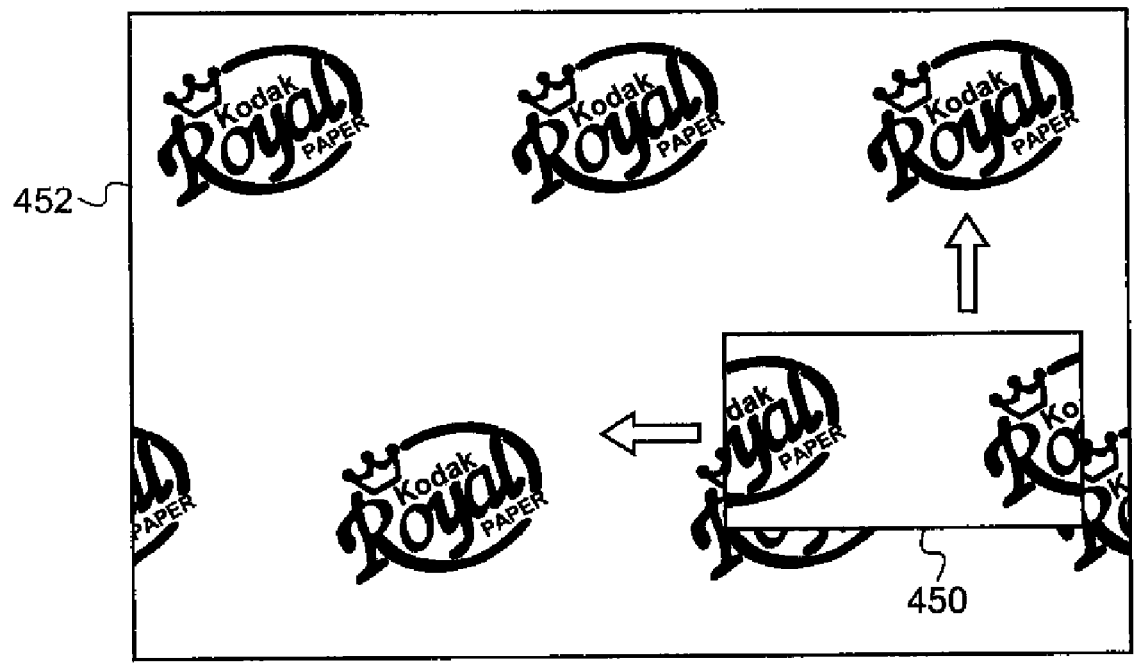
FIG. 9A illustrates translating a watermark bitmap across a matching back scan.

There are various ways that the identify watermark step 16 can identify the matching photographic print watermark 20. In a preferred embodiment of the present invention, a method utilizing a cross-correlation operation is used. In a cross-correlation operation, a first image is translated horizontally and vertically across a second image, and the integral of the product of the two images is calculated at each position. When the two images are similar and are properly aligned, a higher correlation signal is obtained; when the two images are dissimilar or are not aligned a lower correlation signal is obtained. This process is illustrated in FIG. 9A, which shows a watermark bitmap 450 being translated across a back scan 452.

Figure 9B:
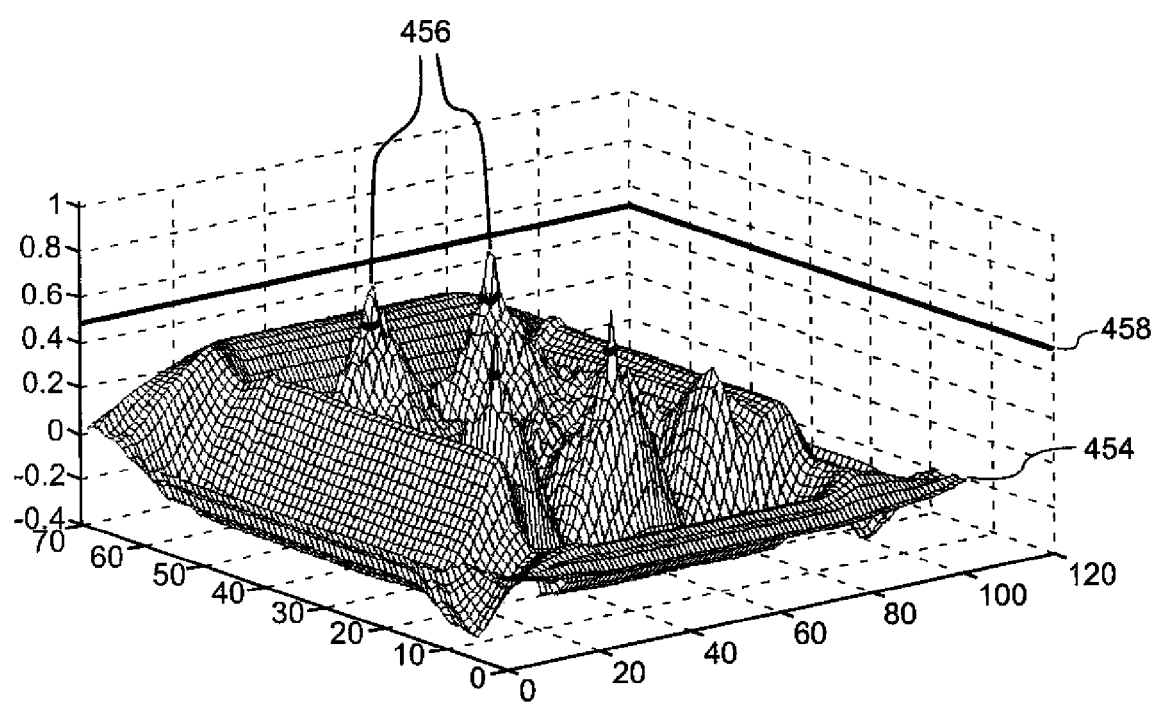
FIG. 9B illustrates a cross-correlation signal for a matching watermark bitmap.

Mathematically, the cross-correlation operation is given by the following equation:

$$C(x, y) = B(x, y) * W(x, y) = \sum_{x_0=1}^{N_x} \sum_{y_0=1}^{N_y} B(x + x_0, y + y_0) W(x_0, y_0) \quad (1)$$

where C(x,y) is a cross correlation image, B(x,y) is a back scan image, W(x,y) is a watermark bitmap, $N_x$ and $N_y$ are the horizontal and vertical sizes of the watermark bitmap, respectively, x and y are the row and column indices, and $x_0$ and $y_0$ are loop indices. This calculation is repeated for each x and y position to determine a full cross-correlation image. FIG. 9B shows a surface plot 454 of the cross-correlation image computed for the example given in FIG. 9A. It can be seen that there are large correlation peaks 456 corresponding to the x and y positions where the watermark bitmap 50 lines up with the corresponding watermark pattern in the back scan 452. A threshold 458 can be applied to the cross correlation image. If any correlation peaks 456 in the cross-correlation image exceed the threshold, as is the case in FIG. 9B, then the back scan 452 is identified as containing the particular watermark pattern.

Figure 10:
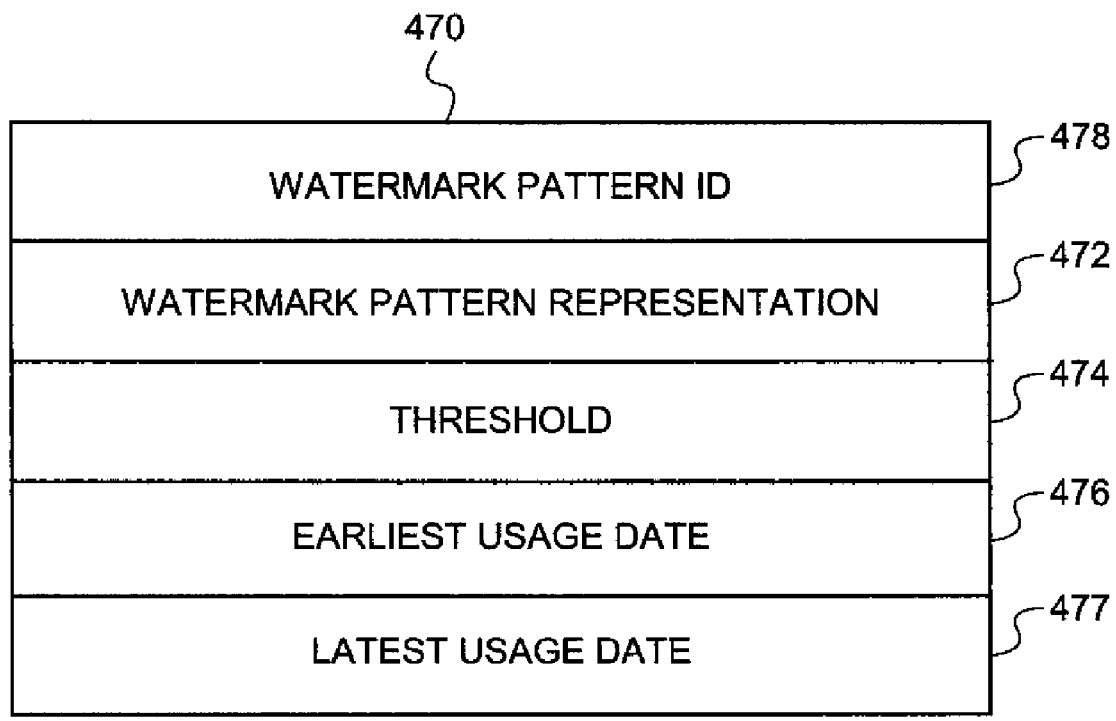
FIG. 10 illustrates an example watermark data structure.

The particular value used for the threshold 458 is determined by training the process using known patterns. For optimal performance, it will be desirable to use a custom threshold for each different photographic print watermark in the photographic print watermark database 18. In a preferred embodiment of the present invention, a threshold value for each photographic print watermark is stored in the photographic print watermark database 18 together with a representation of the watermark pattern and the corresponding date range for which the particular photographic print watermark was used. A watermark data structure can be defined to store the information associated with each photographic print watermark in the photographic print watermark database 18. An example of a watermark data structure 470 that can be used in accordance with the present invention is shown in FIG. 10. The watermark data structure 470 is comprised of several fields. A watermark pattern representation field 472 is used to store a representation of the watermark pattern. As described earlier, this can either be a watermark bitmap or some other representation such as a geometric description. A threshold field 474 is used to store a threshold value that is appropriate for the particular photographic print watermark. An earliest usage date field 476 and a latest usage date field 477 is used to store a date range associated with the photographic print watermark. A watermark pattern ID field 478 is also used to provide a unique identifier for each photographic print watermark.

Figure 9C:
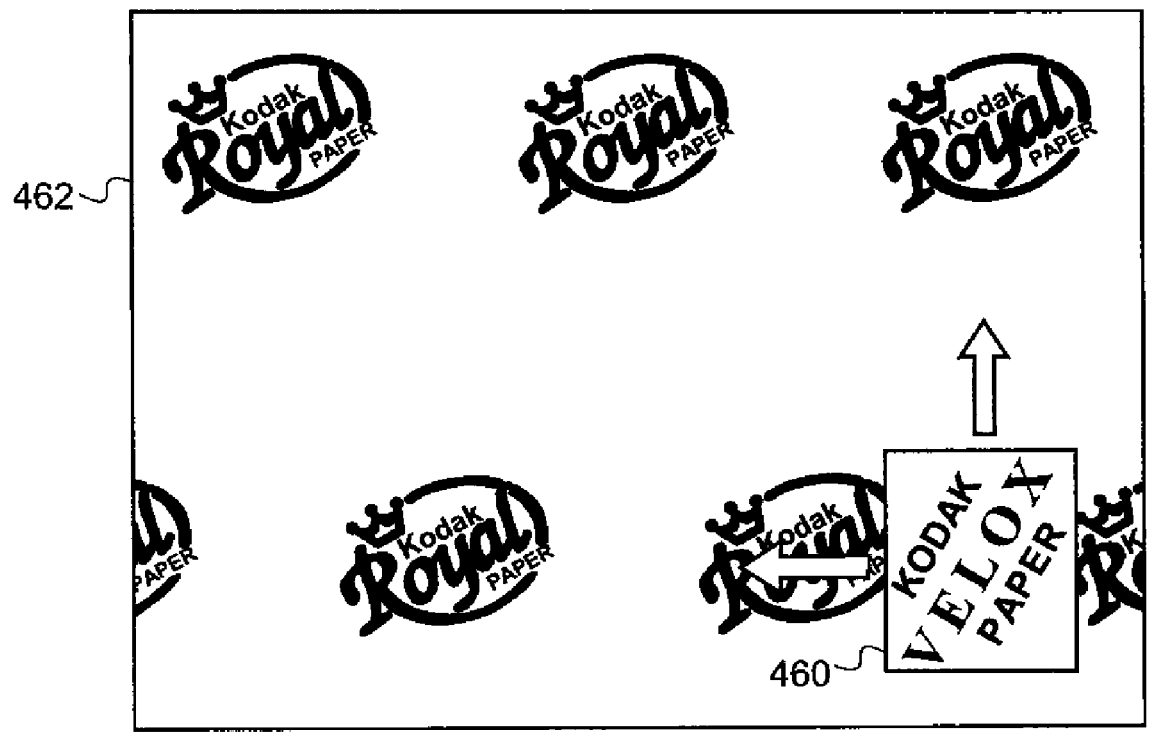
FIG. 9C illustrates translating a watermark bitmap across a non-matching back scan.
Figure 9D:
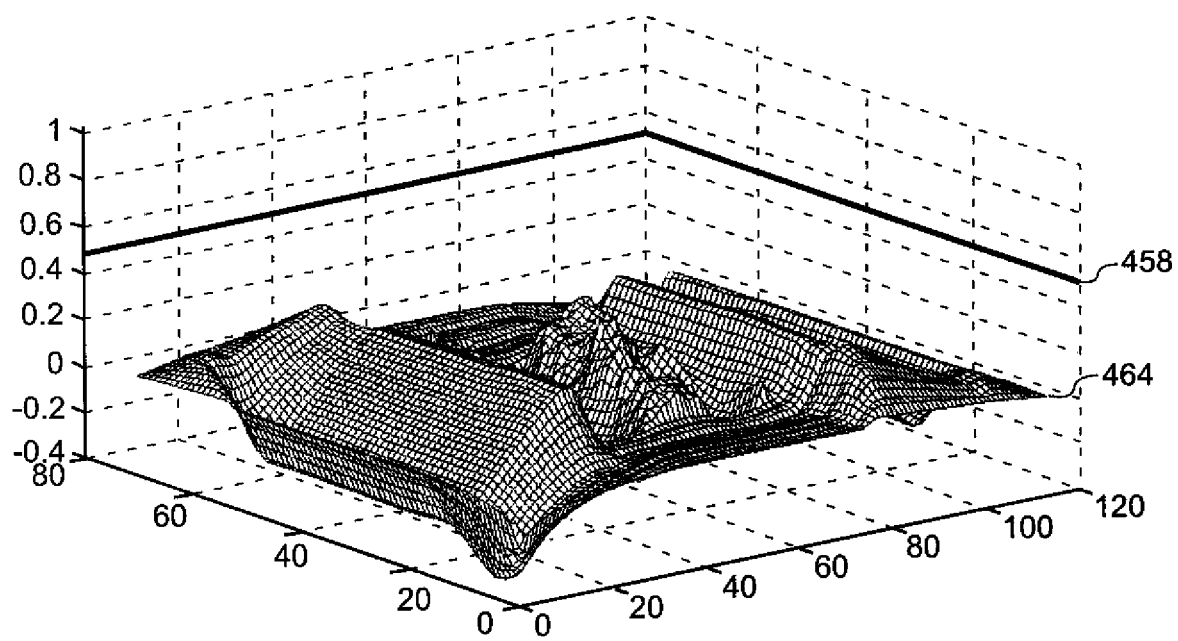
FIG. 9D illustrates a cross-correlation signal for a non-matching watermark bitmap.

FIG. 9C illustrates the case where a watermark bitmap 460 is cross-correlated with a back scan 462 that has a watermark pattern different from that of the watermark bitmap 460. FIG. 9D shows a surface plot 464 of the cross-correlation image generated for the example shown in FIG. 9C. In this case, the surface plot 464 does not contain any large correlation peaks. Therefore, when the threshold 458 is applied to the cross correlation image, no peaks exceeding the threshold 458 are found, and therefore no matching photographic print watermark pattern is detected.

The orientation that the photographic print 8 is fed into the scanner is arbitrary. Therefore, the orientation of the watermark pattern in the back scan 14 is unknown in general. In order to properly detect the watermark pattern, the cross-correlation process can be executed for a particular watermark pattern in each of four different orientations. Each orientation corresponds to a different rotation of the watermark bitmap in 90 degree increments.

During the identify watermark step, the back scan 14 is compared to each orientation of each watermark pattern until a matching watermark pattern is detected. Once a matching watermark pattern is found, it is not necessary to continue checking the remaining patterns and orientations. Therefore to improve computation efficiency, the comparison process can be halted as soon as a matching pattern is found. To maximize the computation efficiency, the highest probability watermark patterns can be checked first and the watermark patterns that are rarely encountered rarely can be checked last. An automatic learning process can be used to adjust the order that the patterns are checked by adapting to the distribution of watermarks that are encountered in the system. When scanning a set of photographic prints, it may be desirable to check the watermark pattern identified for the previous photographic print first because it is likely that the prints may be from same roll of film, or at least from a similar time period.

Another way that the computational efficiency can be improved is to perform a preliminary screening step to determine whether any watermark is present in the back scan 14. Some photographic print materials do not have a watermark. Therefore, if the back scan is found to be totally white, there is no value to perfuming the cross-correlation calculations with each of the different watermark patterns. In this case, it may be possible to estimate the date of the photographic print using other cues such as back printing and print geometry.

If the photographic print 8 is skewed slightly during the scanning process, this can interfere with the proper detection of the watermark pattern during the cross-correlation process. Therefore, it will be helpful in some cases to use a de-skewing algorithm to correct for any skew introduced to the back scan 14 during the scan print step 10. Such de-skewing algorithms are well-known to one skilled in the art, and generally rely on determining a skew angle by detecting the edge of the print in the image scan.

For the case where geometric descriptions are used to represent the photographic print watermarks in the photographic print watermark database 18, several different approaches can be used for the identify watermark step 16. In one embodiment, the geometric description for a particular photographic print watermark can be used to form a corresponding watermark bitmap that can be used with the cross-correlation process described above. Alternatively, the back scan can be analyzed to determine geometric parameters that can be compared with the geometric descriptions of the photographic print watermarks. For example, if the photographic print watermark contains a series of lines having different angles, line widths and line spacings, the back scan 14 can be analyzed to determine the geometric parameters associated with each of the lines. The geometric parameters can then be compared to the geometric descriptions for each of the watermarks in the photographic print watermark database 18 to identify the matching photographic print watermark.

Another method that can be used for the identify watermark step 16 is to use so-called scale-invariant-feature-transform (SIFT) techniques. One such SIFT technique is described in Lowe, D., "Distinctive Features from Scale-Invariant Keypoints," International Journal of Computer Vision, vol. 60, no. 2, pp. 91-110, 2004. SIFT features acquired via a SIFT algorithm are scale and rotation invariant. The SIFT technique described by Lowe identifies salient points as locations of an image that can be accurately identified regardless of scale of the image and regardless of many different transforms of the image (e.g., different scan orientations and resolutions). The SIFT technique uses a cascade filtering approach to identify candidate salient points. The SIFT technique then performs a detailed fit to the nearby data for location, scale, and ratio of principal curvatures for each candidate salient point. The SIFT technique rejects candidate salient points that have low contrast and are poorly localized along an edge. Next, a local image descriptor (i.e., "feature") is generated for each salient point. The SIFT technique generates features that are orientation invariant by first computing the gradient magnitude and orientation of each image sample in a region around the salient point. The SIFT technique then accumulates these samples into orientation histograms summarizing the content over a 4×4 region. Each histogram may have eight bins representing different orientations resulting in a feature that is represented by a 128 (4×4×8) feature vector. Comparison of features acquired from a back scan image and features from an exemplar watermark image can be made using a nearest neighbor search algorithm. Determining if an exemplar watermark image matches the watermark (if any) on a back scan image can be made based on the quantity of features matched. One skilled in the art will appreciate that other techniques may be used to identify the salient points of an image and the features of the salient points and feature matching.

There may be cases where two watermarks differ only in the color of the watermark pattern. In such cases, it may be desirable to also use information about the color of the watermark pattern in the back scan 14 during the identify watermark step 18. The color of the watermark pattern can be determined by examining the color values of the non-white regions in the back scan 14. The resulting color value can be compared to a reference color for a particular watermark pattern that can be stored as a field in the watermark data structures in the photographic print watermark database 18.

Once the identify watermark step 16 has been used to determine the matching photographic print watermark 20, the determine date range step 22 is used to determine the corresponding date range 24. In a preferred embodiment of the present invention, the matching photographic print watermark 20 is identified using the watermark pattern ID field stored with each watermark pattern in the photographic print watermark database 18. In this case, the determine date range step 22 can operate by simply looking up the date range stored in the date range field 476 in the watermark data structure 470 for the matching photographic print watermark 20.

In some cases, the date range associated with a particular watermark pattern may be relatively narrow, allowing the photographic print 8 to be identified within a narrow date range. In other cases, the date range associated with a particular watermark pattern may be relatively wide. Therefore, it may be valuable to be able to use additional pieces of information to further narrow the date range. One source of such additional information can be data extracted from back printing on the back of the photographic print. As was discussed earlier, such back printing includes information printed on the back of the photographic print during the photofinishing process, or labels added to the back of the photographic print by a user. For example, the back printing added by many photofinishers will contain the date that a particular print was made or that the image was captured. If the presence of back printing is detected in the back scan 14, then an optical character recognition (OCR) algorithm can be applied to identify the alphanumeric characters in the back printing. The alphanumeric characters can then be analyzed to extract a date string.

If the back scan 14 is determined to include labels added by a user (e.g., handwritten notations), the labels can be analyzed to determine whether they contain any date information. Algorithms for extracting alphanumeric characters from handwritten text are well-known in the art, and are commonly used for applications such as mail sorting. Such algorithms can be applied to search for any strings of number and characters that may provide clues as to the date of the print.

Additional information that relates to the date range can also be obtained by analyzing the image scan 12. For example, image characteristics such as color saturation of the image, size, shape and format of the photographic print and the style of any borders present on the image can all provide clues as to the date of the photographic print. In some cases, there may be a date printed on photographic image that can be detected. For example, as was discussed earlier, some photofinishing systems automatically printed a date field in the border of the image during the photofinishing process. Additionally, some cameras have optional features which allowed a date to be automatically added to the image at the time of image capture.

The determine date range step 22 can supplement the date range associated with the matching photographic print watermark 20 with any additional information extracted from the image scan 12 or the back scan 14 to provide a best estimate of the date range 24 for the photographic print 8. For example, if a date field is identified either on the back of the photographic print as illustrated in FIGS. 3A, 3C and 4C, or in the border of the photographic print as shown in FIG. 3B, or on the front of the photographic print as shown in FIGS. 4A and 4B, then an optical character recognition algorithm can be used to read the date. This can then be used to narrow down the date range, often to a particular day or year. Alternatively, other types of information that can be gleaned from either the image scan 12 or the back scan 14 can be used to refine the estimated date range. For example, the distribution of colors in the image scan can be used to estimate the amount of image fading that has occurred. This information can provide clues about the age of the photographic print. Similarly, other factors such as image size, image shape, image format and image border style can all provide additional information that can be correlated to the age of the photographic print.

In one embodiment of the present invention, date ranges can be determined for each of a plurality of such factors. The determine date range step 22 can then determine a combined date range by overlapping each of the individual date ranges. For example, if the identified matching photographic print watermark 20 has an associated date range of 1960-1970, and the photographic print has an image size that was commonly used in the years 1965-1980, then a combined date range of 1965-1970 can be inferred.

In another embodiment, the determine date range step 22 can use a probabilistic approach to calculate a highest probability date range. This approach may be appropriate when considering factors, such as color distribution, that are not associated with a well-defined date range. One probabilistic approach involves determining individual probability distribution functions for the dates for each of a plurality of date predictors. The individual probability distributions can then be combined to form an overall probability distribution function using methods that are well-known in the statistical arts. A date range can then be determined that satisfies a certain specified confidence limit (e.g., 95% confidence limits).

Once the date range 24 has been determined, the associate date range with image step 26 is used to associate the date range 24 with the image scan 12. In a preferred embodiment of the present invention the date range 24 is stored as metadata in a digital image file used to store the image scan 12. For example, if the image scan 12 is stored using the well-known EXIF file format, the date range can be stored in a field of the EXIF file header.

In an alternate embodiment of the present invention, the date range can be used to control the location that the digital image is stored in a hierarchical file system. For example, different "folders" can be provided for each decade, and the image file can be automatically stored in the appropriate folder corresponding to the date range 24.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

| PARTS LIST | |
|---|---|
| 8. | photographic print |
| 10 | scan print step |
| 12 | image scan |
| 14 | back scan |
| 16 | identify watermark step |
| 18 | photographic print watermark database |
| 20 | matching photographic print watermark |
| 22 | determine date range step |
| 24 | date range |
| 26 | associate date range with image step |
| 28 | dated image |
| 30 | analyze scans step |
| 32 | additional information |
| 60 | photographic print |
| 65 | photographic greeting card |
| 70 | back side |
| 80 | watermark pattern |
| 90 | watermark pattern |
| 100 | encoding mark |
| 110 | stamp |
| 120 | date of processing indication |
| 130 | additional information |
| 140 | border |
| 150 | graphic |
| 160 | image side |
| 162 | image |
| 170 | printed indicia |
| 180 | time |
| 190 | date |
| 200 | film roll ID number |
| 210 | film roll frame number |
| 215 | camera exposed indicia |
| 220 | time |
| 230 | date |
| 240 | decorative graphic |
| 250 | event designation |
| 260 | personal message |
| 270 | date |
| 280 | handwritten date annotation |
| 285 | handwritten annotation |
| 290 | watermark pattern |
| 300 | photographic print media |
| 305 | rounded corners |
| 310 | watermark pattern |
| 320 | watermark pattern |
| 410 | first watermark pattern |
| 415 | first date range |
| 420 | second watermark pattern |
| 425 | second date range |
| 430 | third watermark pattern |
| 435 | third date range |
| 440 | watermark bitmap |
| 442 | back scan |
| 450 | watermark bitmap |
| 452 | back scan |
| 454 | surface plot |
| 456 | correlation peaks |
| 458 | threshold |
| 460 | watermark bitmap |
| 462 | back scan |
| 464 | surface plot |
| 470 | watermark data structure |
| 472 | watermark pattern representation field |
| 474 | threshold field |
| 476 | earliest usage date field |

-continued

PARTS LIST

| | |
|---|---|
| 477 | latest usage date field |
| 478 | watermark pattern ID field |

The invention claimed is:

1. A method for dating photographic prints comprising:
   a) scanning a front side of a photographic print forming an image scan;
   b) scanning a back side of the photographic print forming a back scan;
   c) defining a database of photographic print watermarks, each photographic print watermark comprising a representation of a watermark pattern and an associated date range;
   d) analyzing the back scan using a cross-correlation process between the back scan and the watermark patterns in the database of photographic print watermarks to identify a matching photographic print watermark, and by further analyzing the back scan to determine a color of the photographic print watermark in;
   e) determining a date range for the image scan responsive to the identified matching photographic print watermark and the determined color of the photographic print watermark; and
   f) associating the determined date range with the image scan;
   wherein a matching photographic print watermark is identified when a signal generated by the cross-correlation process exceeds a predetermined watermark-dependent threshold value associated with each photographic print watermark, wherein a training process is used to determine the watermark-dependent threshold value for each photographic print watermark.

2. The method of claim 1 wherein the scanning steps are performed using a high speed scanner that simultaneously scans both the front side and the back side of the photographic print.

3. The method of claim 1 wherein the scanning steps are performed using a flatbed scanner.

4. The method of claim 1 wherein the representations of the watermark patterns in the database of photographic print watermarks include bitmaps of the watermark patterns.

5. The method of claim 4 wherein the bitmaps of the watermark patterns include at least one period of periodic watermark patterns.

6. The method of claim 1 wherein the representations of the watermark patterns in the database of photographic print watermarks include geometric descriptions of the watermark patterns.

7. The method of claim 1 wherein the associated date range corresponds to the range of dates that a photographic print material having the associated watermark pattern was manufactured.

8. The method of claim 1 wherein the step of analyzing the back scan further includes a preliminary screening process for determining whether the back scan contains a photographic print watermark.

9. The method of claim 1 further including the step of analyzing the back scan or the image scan to provide additional information that is used in the step of determining the date range for the image scan.

10. The method of claim 9 where any back printing contained in the back scan is analyzed to provide the additional information.

11. The method of claim 10 wherein the back printing includes information printed during a photofinishing process.

12. The method of claim 10 wherein the back printing includes labels added to the back of the photographic print by a user.

13. The method of claim 10 wherein the additional information includes image size, image shape, image format, image border style, image color characteristics or date stamp.

14. The method of claim 1, further including the step of storing the image scan in a digital file.

15. The method of claim 14 wherein the associated date range is stored as metadata in the digital file.

16. The method of claim 14 wherein the digital file is stored in a hierarchical file system in a location associated with a particular date range.

17. The method of claim 1 further including a de-skewing step to correct for any skew introduced into the back scan during the back side scanning step.

18. The method of claim 1 wherein the cross-correlation process is applied for multiple orientations of the watermark patterns.

19. A system for dating photographic prints comprising:
   a) a scanner for scanning a front side of a photographic print forming an image scan;
   b) a scanner for scanning a back side of the photographic print forming a back scan;
   c) a database of photographic print watermarks, each photographic print watermark comprising a representation of a watermark pattern and an associated date range;
   d) a processor for analyzing the back scan using a cross-correlation process between the back scan and the watermark patterns to identify a matching photographic print watermark from the database of photographic print watermarks, analyzing the back scan to determine a color of the photographic print watermark, and determining a date range responsive to the matching photographic print watermark and the determined color of the photographic print watermark, wherein a matching photographic print watermark is identified when a signal generated by the cross-correlation process exceeds a predetermined watermark-dependent threshold value associated with each photographic print watermark, wherein a training process is used to determine the watermark-dependent threshold value for each photographic print watermark; and
   e) a means for associating the date range associated with the identified photographic print watermark with the image scan.

* * * * *